(12) United States Patent
Kirkendall-Rodriguez et al.

(10) Patent No.: US 8,869,182 B2
(45) Date of Patent: Oct. 21, 2014

(54) PRESENTING LISTENER INFORMATION

(75) Inventors: Brice Kirkendall-Rodriguez, New York, NY (US); Philippe Generali, Scarsdale, NY (US); Gary Marince, Moon Township, PA (US)

(73) Assignees: iHeartMedia Management Services, Inc., San Antonio, TX (US); The Nielson Company (US), LLC, Schaumburg, IL (US)

( * ) Notice: Subject to any disclaimer, the term of this patent is extended or adjusted under 35 U.S.C. 154(b) by 597 days.

(21) Appl. No.: 13/014,899

(22) Filed: Jan. 27, 2011

(65) Prior Publication Data

US 2011/0134129 A1 Jun. 9, 2011

Related U.S. Application Data

(63) Continuation of application No. 12/631,551, filed on Dec. 4, 2009, which is a continuation-in-part of application No. 12/539,885, filed on Aug. 12, 2009.

(60) Provisional application No. 61/193,515, filed on Dec. 4, 2008, provisional application No. 61/136,092, filed on Aug. 12, 2008, provisional application No. 61/193,516, filed on Dec. 4, 2008.

(51) Int. Cl.
| | |
|---|---|
| *H04H 60/33* | (2008.01) |
| *H04H 60/32* | (2008.01) |
| *H04H 60/44* | (2008.01) |
| *G06Q 30/02* | (2012.01) |
| *H04H 60/31* | (2008.01) |
| *H04H 60/46* | (2008.01) |

(52) U.S. Cl.
CPC ........... *H04H 60/44* (2013.01); *G06Q 30/0204* (2013.01); *H04H 60/33* (2013.01); *H04H 60/46* (2013.01); *H04H 60/31* (2013.01)

USPC .................................................. 725/9; 725/14

(58) Field of Classification Search
USPC .................................................. 725/8, 9, 14
See application file for complete search history.

(56) References Cited

U.S. PATENT DOCUMENTS

| | | | |
|---|---|---|---|
| 6,295,092 B1 | 9/2001 | Hullinger et al. | |
| 7,239,981 B2 | 7/2007 | Kolessar et al. | |
| 2002/0138830 A1* | 9/2002 | Nagaoka et al. | 725/14 |
| 2002/0194585 A1 | 12/2002 | Connelly | |
| 2003/0037333 A1 | 2/2003 | Ghashghai et al. | |
| 2006/0010470 A1* | 1/2006 | Kurosaki et al. | 725/46 |

(Continued)

FOREIGN PATENT DOCUMENTS

| | | |
|---|---|---|
| WO | WO2004012121 | 2/2004 |
| WO | WO2005094325 | 10/2005 |

*Primary Examiner* — Nasser Goodarzi
*Assistant Examiner* — Michael Hong
(74) *Attorney, Agent, or Firm* — Garlick & Markison; Edward J. Marshall

(57) ABSTRACT

Listening information indicating a number of audience members who switched stations during each of the designated periods of time is displayed on a graph having a plot representing the listening information. The graph is divided into an upper portion and a lower portion about a normalized line representing an average number of audience members who listened during designated periods of time. Additional plots can also be presented, including plots arranged so that portions above the normalized line represent a greater than average number of listeners, and portions below the normalized line represent a lower than average number of listeners.

14 Claims, 3 Drawing Sheets

(56) References Cited

U.S. PATENT DOCUMENTS

| | | |
|---|---|---|
| 2006/0075421 A1 | 4/2006 | Roberts et al. |
| 2008/0103855 A1* | 5/2008 | Hernandez et al. ............... 705/7 |
| 2008/0195459 A1* | 8/2008 | Stinski ........................... 705/10 |
| 2008/0255904 A1* | 10/2008 | Park et al. ........................ 705/7 |
| 2009/0187932 A1* | 7/2009 | Rathburn et al. ................. 725/9 |

* cited by examiner

PRESENTING LISTENER INFORMATION

RELATED APPLICATIONS

This application is a continuation of co-pending U.S. application Ser. No. 12/631,551, entitled, "Measuring Audience Reaction," filed Dec. 4, 2009, which is a continuation-in-part of U.S. application Ser. No. 12/539,885, entitled, "Determining Audience Response To Broadcast Content," filed Aug. 12, 2009, which claims benefit to the filing date of U.S. Provisional Application No. 61/193,515, entitled, "Method and System for Analyzing Program Audience Reaction," filed Dec. 4, 2008; and U.S. Provisional Application No. 61/136,092, entitled, "Method and System for Analyzing and Trending Audience Switching," filed Aug. 12, 2008; and claims benefit to the filing date of U.S. Provisional Application No. 61/193,516, entitled, "Method and System for Measuring Audience Reaction," filed Dec. 4, 2008.

FIELD

The present disclosure relates generally to using data related to media audiences, and more particularly to presenting information related to a number of listeners during particular periods.

BACKGROUND

Audience demographics and consumption habits are frequently used by broadcast content providers and media stations in industries such as terrestrial and satellite radio, cable, Internet, cellular telephone and other wireless communications, newspapers, billboards, and the like. Media stations are often rated or ranked based on audience membership, listener-ship, viewer-ship, webpage hits, and the like. A greater number of audience members generally results in a higher rating, and potentially greater advertising revenue. This type of information is available from a variety of conventional sources. Arbitron, for example, collects audience exposure data and provides it in various formats, including "Portable People Meter" (PPM) data.

Information about which media programs are broadcast on particular stations at particular times is also used by content providers for various purposes. For example, data related to broadcast content can help evaluate a station's compliance with advertising programs and broadcast schedules. Data identifying stations on which a particular media program was broadcast, and corresponding broadcast times, is available from sources such as Media Monitors, which collects audio from various media stations using field sites in major markets.

Various statistical techniques are commonly used to evaluate available data. However, currently employed evaluation techniques do not take into account all of the possible ways data from various different sources can be usefully combined, evaluated, and presented.

SUMMARY

Information related to listener behavior can be collected and presented graphically using a graphical user interface (GUI). A method according to some embodiments includes collecting information indicating a number of audience members listening during designated periods of time. The collected information can be displayed as a plot on a graph divided into an upper portion and a lower portion about a normalized line representing an average number of audience members who listened during the designated periods of time. In some embodiments one or more of the plots displayed on the graph represent a multi-week moving average.

Various methods include determining an average number of audience members listening at a particular time of day for a particular content provider, and determining a net audience listening value over a time period including more than one day. Various embodiments can be implemented as a system including a processor, memory, and a program of instructions to be stored in the memory and executed by the processor. Other embodiments can be realized as a computer readable medium tangibly embodying a program of instructions to be stored in a memory and executed by a processor.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The term "media," as used herein can refer to radio, TV, internet, billboard, print-media, cellular, WiFi, WiMAX, and other sources associated with distribution of events, content, advertising, etc. delivered via a variety of distribution technologies, including without limitation analog, FM, HD, and digital data technologies, print media, billboards, etc.

Figure 1:
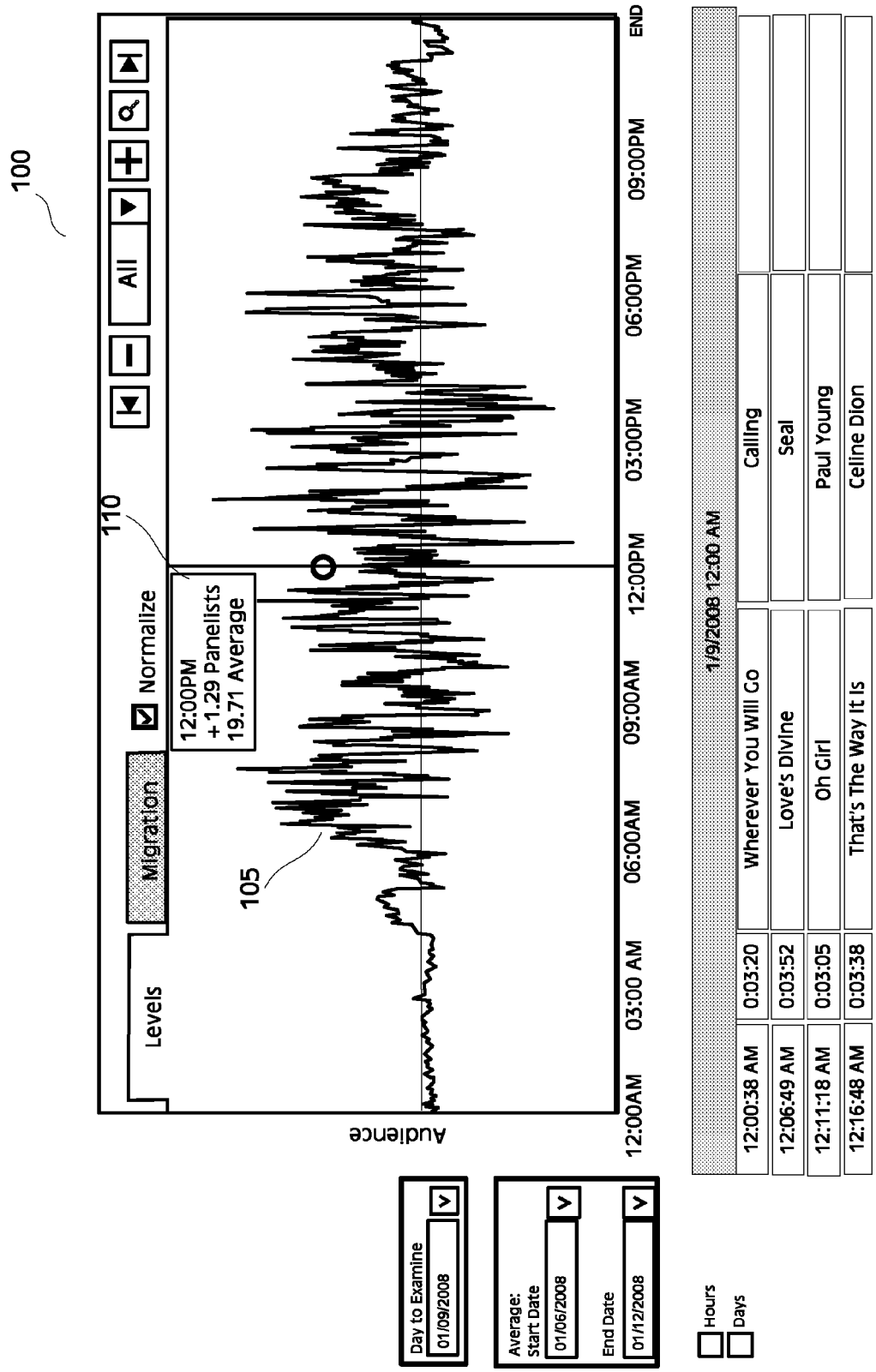
FIG. 1 is a graphical display area of a GUI displaying a normalized view of audience response information according to embodiments of the present disclosure.

Referring first to FIG. 1 an example of a graph 100 displaying normalized audience listening information will be discussed according to various embodiments. In at least one embodiment, normalized audience listening plot 105 represents a difference between the average number of audience members over a first time period and the number of audience members over a period of interest. In the example illustrated in FIG. 1, normalized audience listening plot 105 shows that from 12:00 pm to 12:01 pm on Jan. 9, 2008, there were 1.29 more audience members than the average number of audience members during that same period of time on each day between Jan. 6, 2008 and Jan. 12, 2008. The normalized graph values, along with other information such as the average number of audience members, can be displayed in data pop-up 110, even if some of the information in pop-up 110 is not presented as a graph plot. In some embodiments, the average number of audience members over a period of time can suggest a rate of change in the average number of audience members. Likewise, the rate of change in the number of audience members over a period of time selected for comparison can suggest a rate of change in the number of audience members over that period of time.

Figure 2:
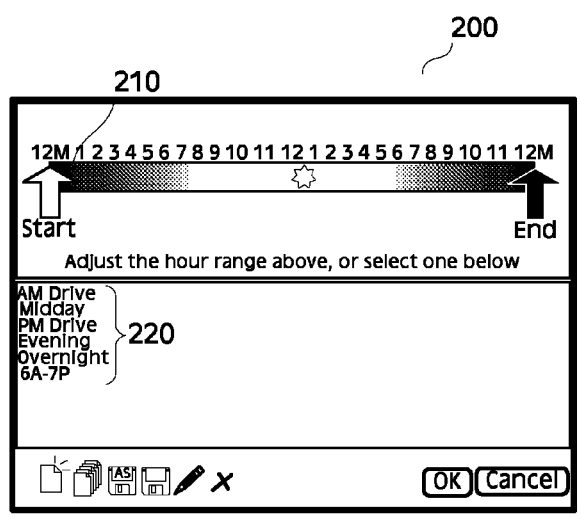
FIG. 2 is a screen shot of a range selection pane according to embodiments of the present disclosure.

With reference now to FIG. 2, an example of a filter pane 200 is illustrated according to various embodiments of the present disclosure. Filter pane 200 can be displayed partially or fully overlaying a graph or other object in graphical representation area, in a tiled pane not overlapping other displayed objects, or otherwise. Filter pane 200 can be utilized to facilitate selection of hour ranges for data displayed in a graph or other object displayed on a GUI. In some embodiments, for example, slider 210 can be used to select desired hours for display in a corresponding graph or other display pane. In other embodiments, a list of dayparts 220 can be displayed, allowing a user to choose data from the morning drive for display and analysis.

Figure 3:
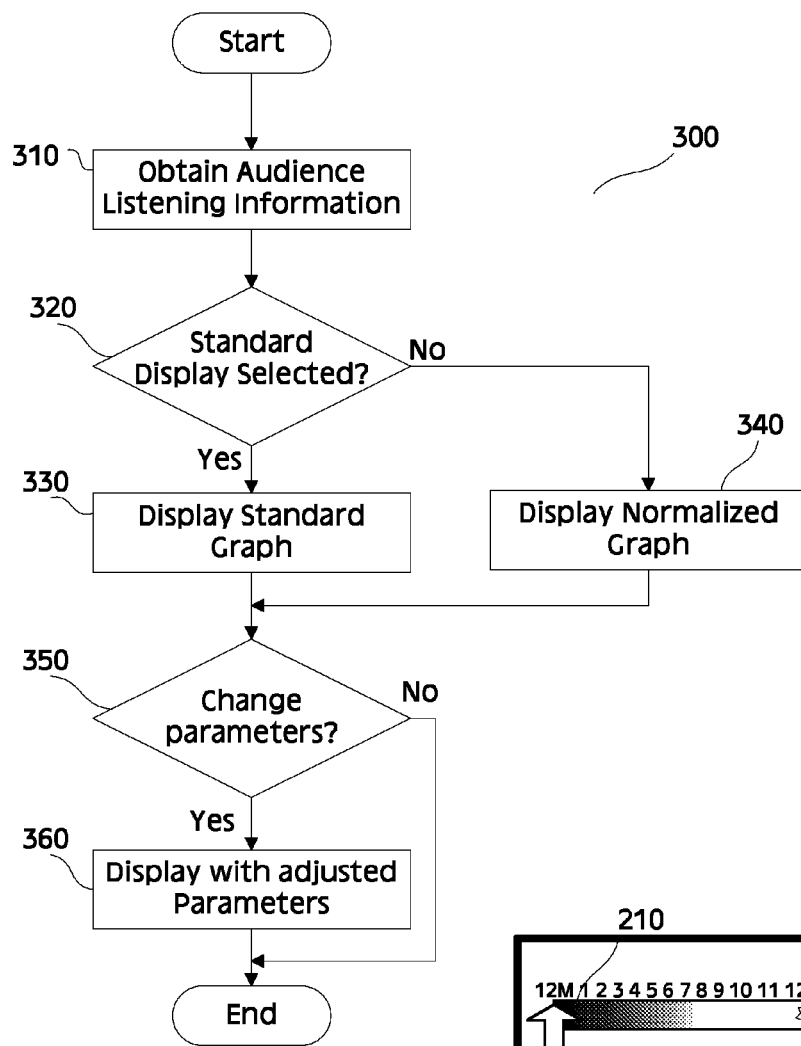
FIG. 3 is a flow chart illustrating a method of displaying audience listening information.

Referring next to FIG. 3, a method 300 according to some embodiments is discussed. As illustrated by block 310, audience listening information is obtained. In some embodiments, the audience listening information can be obtained from a local or remote database, which can be accessed by any of various methods, including but not limited to Internet web sites. Audience listening information data from multiple different providers. Obtaining listening information can include obtaining fully processed information, partially process information, or raw data. If raw data from one or more sources is received at a server or other device, some embodiments can process the raw data to determine how many audience members are listening to a particular station at a given time.

In some embodiments, more completely processed information can also be received by a server, device, or other computational system implementing various methods discussed herein. In some instances, fully processed information includes audience listening information that has already been processed to determine values to be plotted on a graph, although processing for display purposes may still be required. Some such embodiments allow a central or distributed server or system to perform the bulk of the calculations, while allowing users at remote terminals to access and display the data according to desired parameters.

As illustrated by block 320, a check can be made to determine which type of display a user desires. In some embodiments, a GUI is used to display one or more areas, display panes, and other user selectable objects through which a user can indicate his preferences. In some embodiments, a user can select to display a standard graph, a normalized graph, or any number of other graphical representations of the audience listening information, over any of various periods of time.

As illustrated by block 330, if a standard type of audience listening graph is selected, a GUI can be used to display the standard graph in a graphical display area, such as a graph pane, or the like. A standard graph of audience listening information can include one or more different plots representing different aspects of the audience listening information. In some embodiments, a plot representing a sample number of audience members can represent the number of audience members at the beginning of the time period in question, at the end of the time period, during a middle of the time period in question, or otherwise. For example, the sample number of audience members can, in some instances, represent an average number, a mean, or another desired statistical value.

As illustrated by block 340, if a standard graph display is not selected, a normalized graph can be displayed. As used herein, the term "normalized" is used in a broad sense, and is not intended to limit the disclosure to a rigid statistical definition, although some embodiments can be used to generate normalized graphs within the strictest statistical definition.

As illustrated by block 350, a check can be made to determine if a user has elected to change any of the display parameters for the GUI. For example, a user may change the time of day using a filter pane or other user selectable object, so that different audience listening information is being considered, or so that the same audience listening information is being compared against different averages, means, or the like. Furthermore, a user may select a different time portion of a graph already being displayed, thereby causing information in an associated pane to change. As illustrated by block 360, a GUI display can be changed to display data consistent with the newly entered user parameters.

Figure 4:
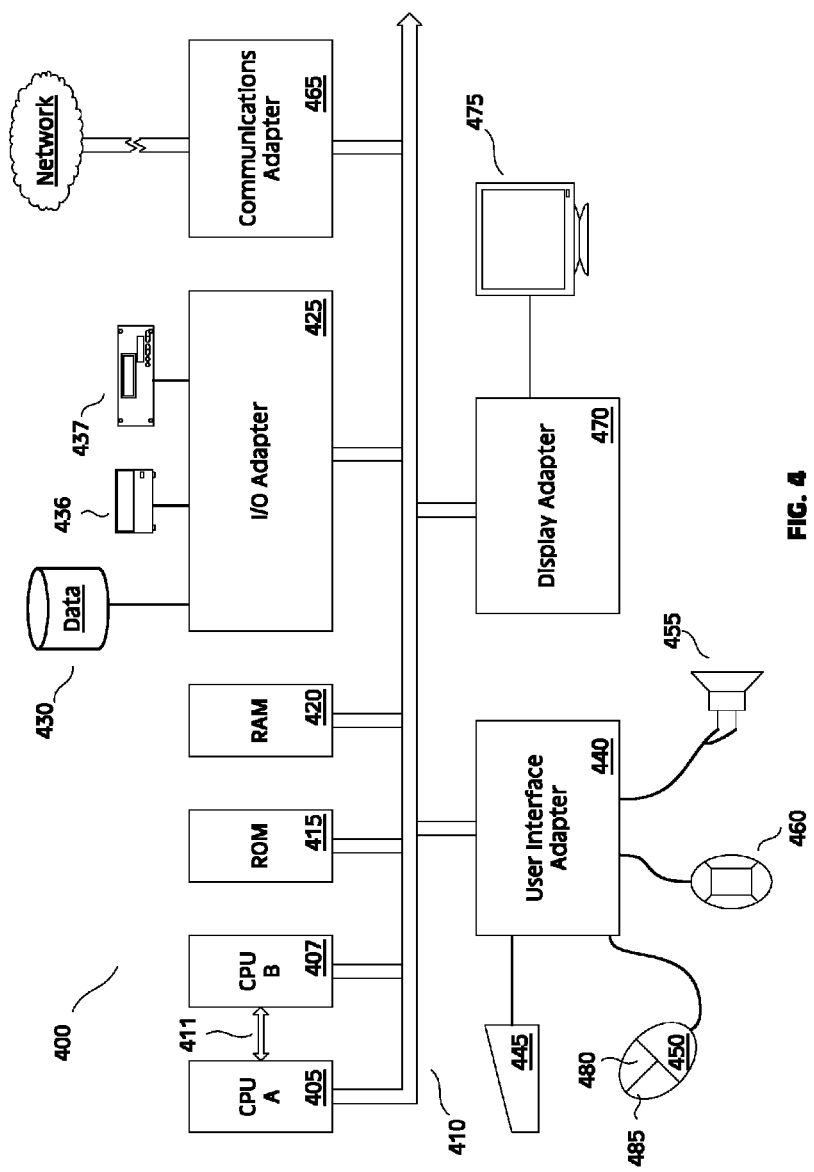
FIG. 4 is a high level block diagram of a processing system according to embodiments of the present disclosure.

Some or all of the methods and processes described herein can be embodied in or performed by one or more processing systems. An example of such a processing system is discussed with reference to FIG. 4. Processing system 400 includes one or more central processing units, such as CPU A 405 and CPU B 407, which may be conventional microprocessors interconnected with various other units via at least one system bus 410. CPU A 405 and CPU B 407 may be separate cores of an individual, multi-core processor, or individual processors connected via a specialized bus 411. In some embodiments, CPU A 405 or CPU B 407 may be a specialized processor, such as a graphics processor, other co-processor, or the like.

Processing system 400 includes random access memory (RAM) 420; read-only memory (ROM) 415, wherein the ROM 415 could also be erasable programmable read-only memory (EPROM) or electrically erasable programmable read-only memory (EEPROM); and input/output (I/O) adapter 425, for connecting peripheral devices such as disk units 430, optical drive 436, or tape drive 437 to system bus 410; a user interface adapter 440 for connecting keyboard 445, mouse 450, speaker 455, microphone 460, or other user interface devices to system bus 410; communications adapter 465 for connecting processing system 400 to an information network such as the Internet or any of various local area networks, wide area networks, telephone networks, or the like; and display adapter 470 for connecting system bus 410 to a display device such as monitor 475. Mouse 450 has a series of buttons 480, 485 and may be used to control a cursor shown on monitor 475. Monitor 475 can be used to display a graphical user interface (GUI), implemented by a program of instructions executed by either or both of CPU A 405 and CPU B 407.

It will be understood that processing system 400 may include other suitable data processing systems without departing from the scope of the present disclosure. For example, processing system 400 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

The previous detailed description of embodiments of the disclosure depicted in the accompanying drawings. The embodiments are in such detail as to clearly communicate the disclosure. However, the amount of detail offered is not intended to limit variations of the described embodiments; on the contrary, the intention is to cover all modifications, equivalents, and alternatives falling within the spirit and scope of the present disclosure as defined by the appended claims.

What is claimed is:

1. A method comprising:
   obtaining listening information indicating a number of audience members who listened during a designated time on a plurality of different dates, by executing a program instruction in a computer system;

determining a multiple-date-average, wherein the multiple-date-average represents an average number audience members who listened during the designated time on each of the plurality of different dates, by executing a program instruction in a computer system;

displaying, by executing a program instruction in a computer system, a graph including a single plot representing a relationship between the multiple-date-average and a number of audience members who listened during the designated time on a selected date of interest; and wherein the graph is divided into an upper portion and a lower portion about a normalized line representing an average number of audience members who listened during the designated time.

2. The method of claim 1, further comprising:
the plot representing a percentage of expected audience members who listened during the designated time on the plurality of different dates, by executing a program instruction in a computer system.

3. The method of claim 1, wherein:
the number of audience members includes audience members who listened to at least one station during any portion of the designated time.

4. The method of claim 1, wherein:
the plot represents a multi-week moving average.

5. The method of claim 1, further comprising:
determining an average number of listeners at a particular time of day for a particular content provider, by executing a program instruction in a computer system; and determining a net audience value over a time period including more than one day, based on the average number of audience members listening on various different days, and at the particular time of day time, by executing a program instruction in a computer system.

6. A system comprising:
a processor;
memory associated with the processor; and
a program of instructions to be stored in the memory and executed by the processor, the program of instructions including:

at least one instruction to obtain listening information indicating a number of audience members who listened during a designated time on a plurality of different dates;

at least one instruction to determine a multiple-date-average, wherein the multiple-date-average represents an average number audience members who listened during the designated time on each of the plurality of different dates, by executing a program instruction in a computer system;

at least one instruction to display a graph including a single plot representing a relationship between the multiple-date-average and a number of audience members who listened during the designated time on a selected date of interest; and wherein the graph is divided into an upper portion and a lower portion about a normalized line representing an average number of audience members who listened during the designated time.

7. The system of claim 6, further comprising:
at least one instruction to display, on the graph, a plot representing a percentage of expected audience members who listened during the designated time on the plurality of different dates.

8. The system of claim 6, wherein:
the number of audience members includes audience members who listened to at least one station during any portion of the designated time.

9. The system of claim 6, wherein:
the plot represents a multi-week moving average.

10. The system of claim 6, further comprising:
at least one instruction to determine an average number of listeners at a particular time of day for a particular content provider; and at least one instruction to determine a net audience value over a time period including more than one day, based on the average number of audience members listening on various different days, and at the particular time of day time, by executing a program instruction in a computer system.

11. A non-transitory computer readable medium tangibly embodying a program of instructions to be stored in a memory and executed by a processor, the program of instructions comprising:

at least one instruction to obtain listening information indicating a number of audience members who listened during a designated time on a plurality of different dates;

at least one instruction to determine a multiple-date-average, wherein the multiple-date-average represents an average number audience members who listened during the designated time on each of the plurality of different dates, by executing a program instruction in a computer system;

at least one instruction to display a graph including a single plot representing a relationship between the multiple-date-average and a number of audience members who listened during the designated time on a selected date of interest; and wherein the graph is divided into an upper portion and a lower portion about a normalized line representing an average number of audience members who listened during the designated periods of time.

12. The non-transitory computer readable medium of claim 11, further comprising:
at least one instruction to display on the graph a plot representing a percentage of expected audience members who listened during the designated time on the plurality of different dates.

13. The non-transitory computer readable medium of claim 11, wherein:
the number of audience members includes audience members who listened to at least one station during any portion of the designated time.

14. The non-transitory computer readable medium of claim 11, wherein:
the plot represents a multi-week moving average.

* * * * *